(12) United States Patent
Bidner et al.

(10) Patent No.: US 7,832,204 B2
(45) Date of Patent: Nov. 16, 2010

(54) ENGINE SYSTEM INCLUDING HEAT PIPE

(75) Inventors: David Bidner, Livonia, MI (US); Shane Elwart, Ypsilanti, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 993 days.

(21) Appl. No.: 11/612,369

(22) Filed: Dec. 18, 2006

(65) Prior Publication Data

US 2008/0141664 A1 Jun. 19, 2008

(51) Int. Cl.
*F01N 3/02* (2006.01)
*F01N 5/02* (2006.01)

(52) U.S. Cl. .............. 60/320; 60/284; 60/286; 60/298; 123/142.5 R; 165/104.11

(58) Field of Classification Search ........... 60/284–289, 60/298; 165/104.11–104.31; 123/142.5; 476/161

See application file for complete search history.

(56) References Cited

U.S. PATENT DOCUMENTS

| | | | |
|---|---|---|---|
| 4,107,922 A * | 8/1978 | Wossner | 60/298 |
| 4,146,176 A | 3/1979 | Beauvais et al. | |
| 4,220,197 A | 9/1980 | Schaefer et al. | |
| 4,391,235 A | 7/1983 | Majkrzak | |
| 4,884,744 A | 12/1989 | Padjaonkar | |
| 6,151,891 A | 11/2000 | Bennett | |
| 6,427,640 B1 | 8/2002 | Hickey et al. | |
| 6,931,839 B2 * | 8/2005 | Foster | 60/284 |
| 7,063,642 B1 * | 6/2006 | Hu et al. | 477/100 |
| 2005/0202933 A1 | 9/2005 | Sorab et al. | |
| 2006/0054308 A1 * | 3/2006 | Smith et al. | 165/104.21 |

FOREIGN PATENT DOCUMENTS

| | | |
|---|---|---|
| DE | 2850572 | 5/1980 |
| JP | 2002-340284 | 11/2002 |

* cited by examiner

*Primary Examiner*—Thomas E Denion
*Assistant Examiner*—Jesse Bogue
(74) *Attorney, Agent, or Firm*—Julia Voutyras; Alleman Hall McCoy Russell & Tuttle LLP

(57) ABSTRACT

An engine system for a vehicle includes a first heat pipe in contact with the exhaust and a first fluid of the engine system; a second heat pipe in contact with the exhaust and a second fluid of the engine system. In one example, the first heat pipe provides increased heat transfer during a first temperature condition and the second heat pipe provides increased heat transfer during a second temperature condition different than the first temperature condition.

18 Claims, 18 Drawing Sheets

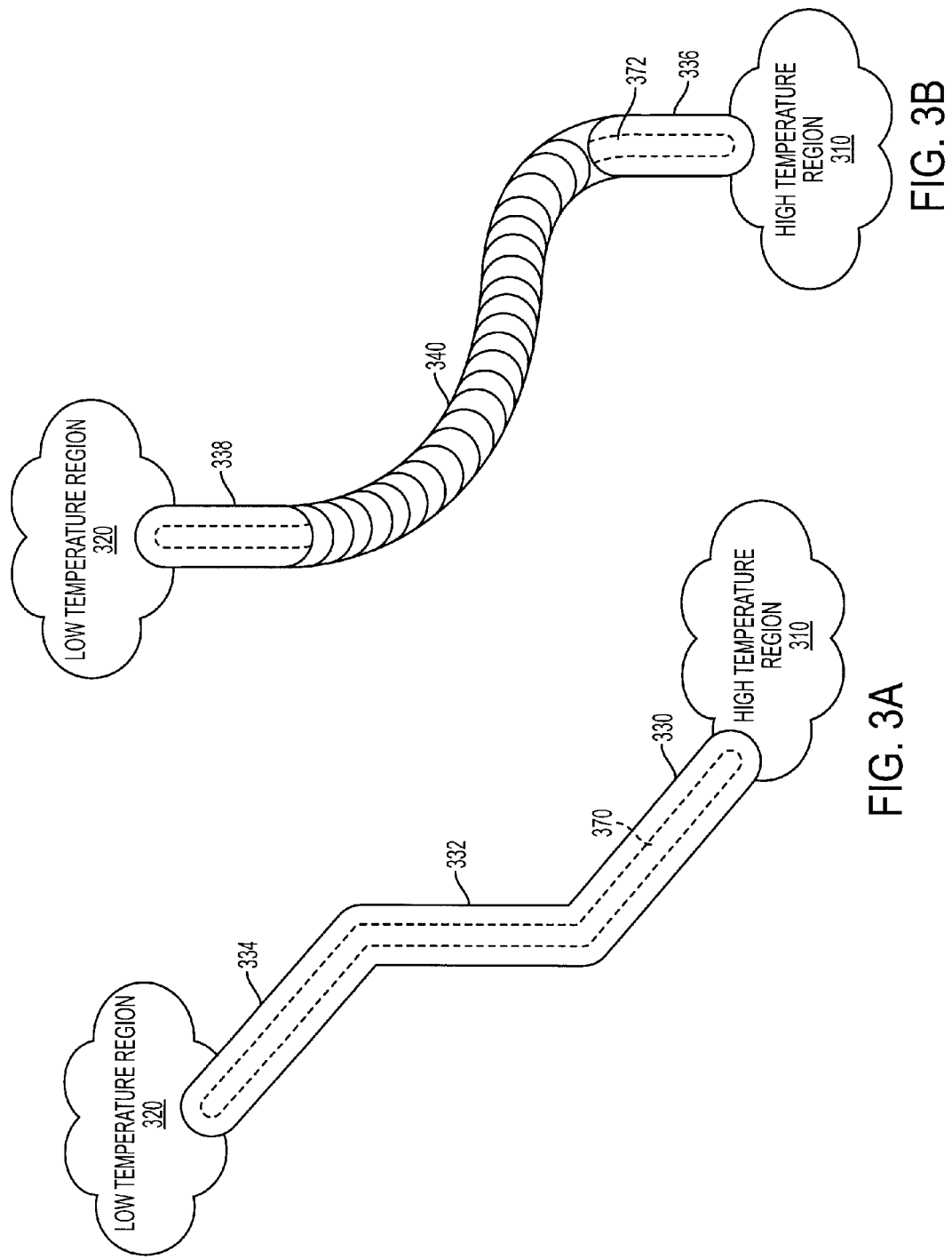

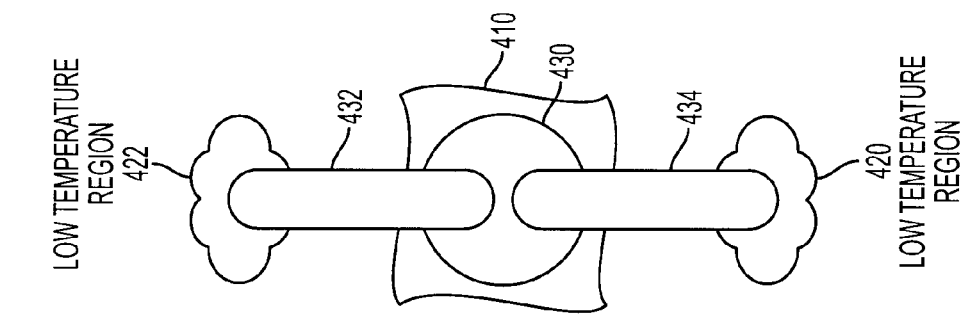
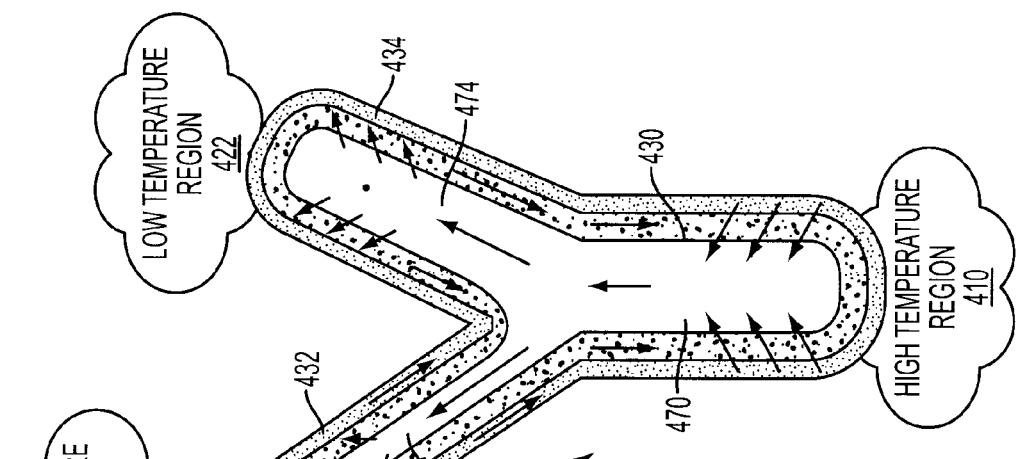
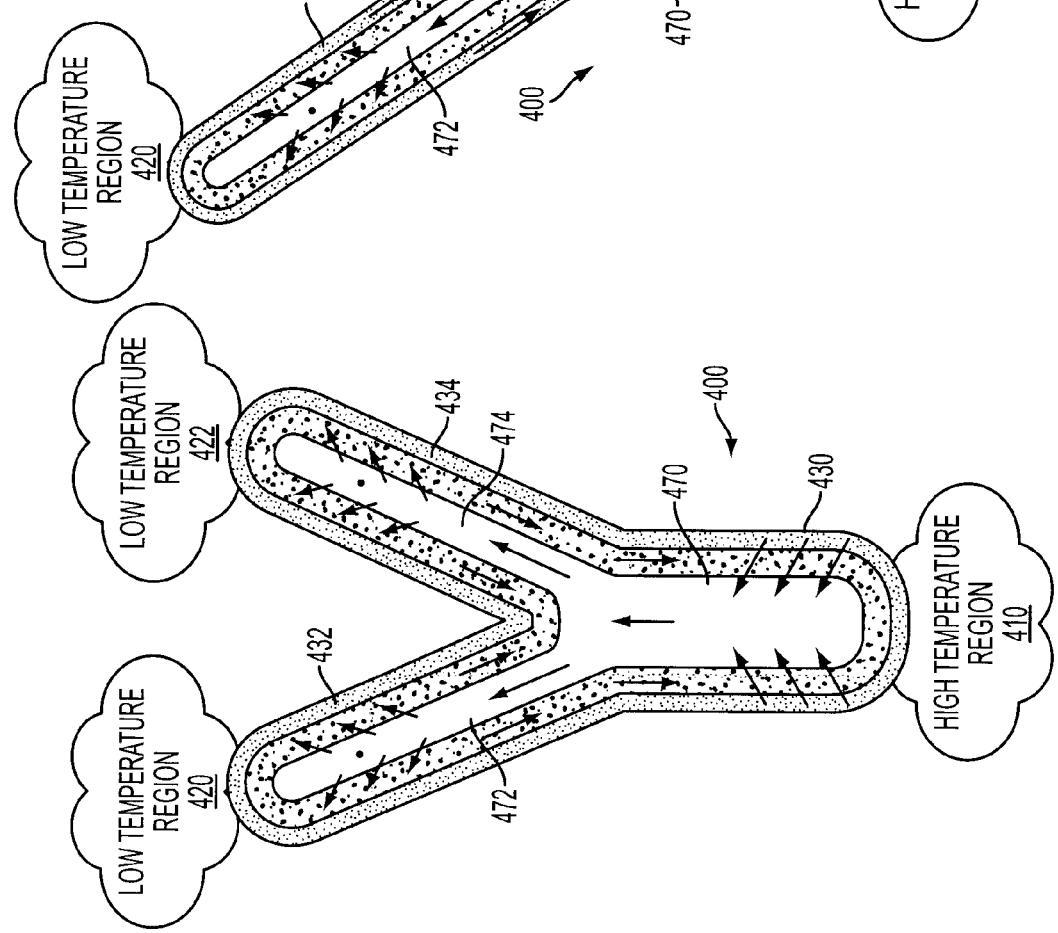
FIG. 4C
FIG. 4B
FIG. 4A

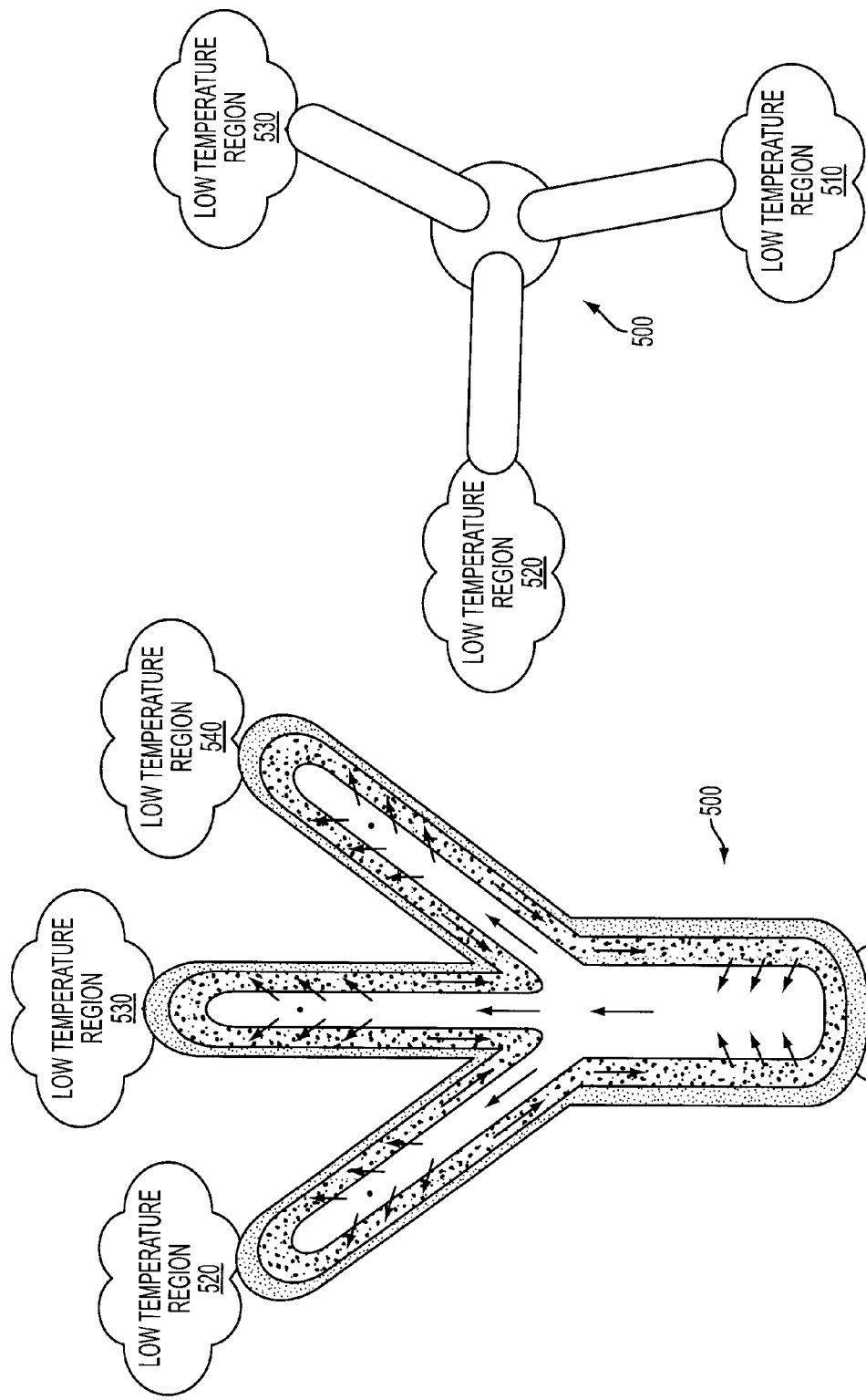

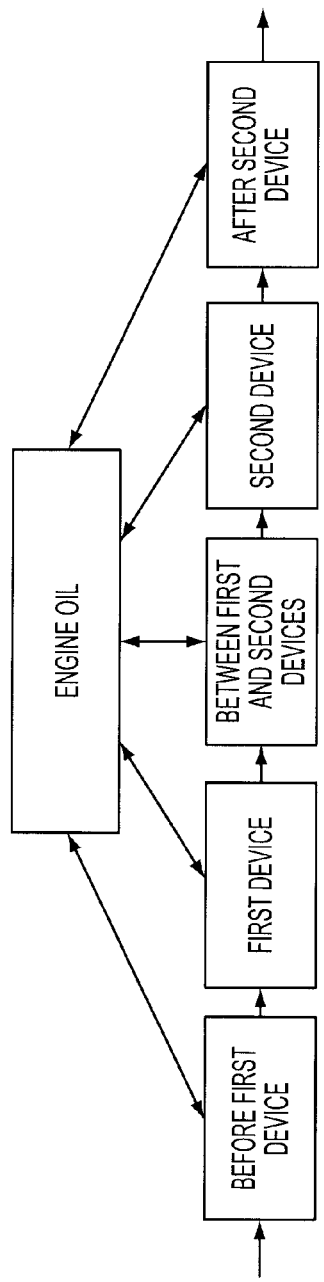
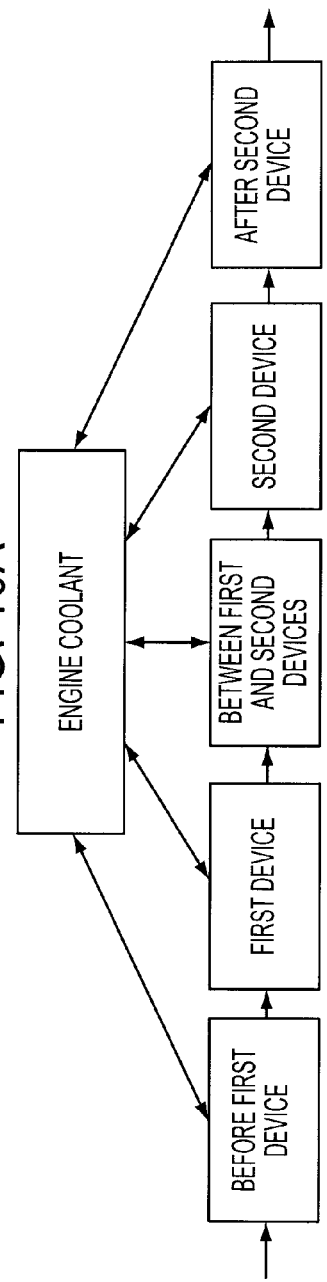
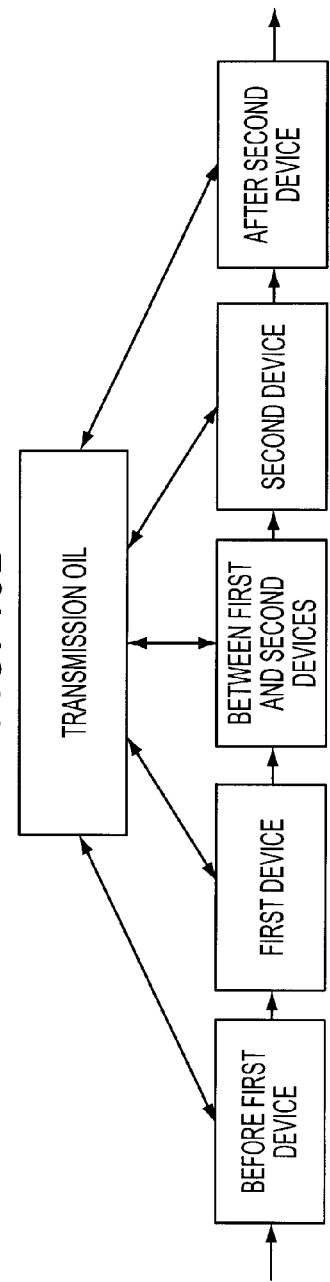

|  |  | INLET TO THE LIGHT-OFF CATALYST | | |
| --- | --- | --- | --- | --- |
|  |  | COLD <800F | OPERATIONAL 800-1650F | OVER TEMPERATURE >1650F |
| ENGINE OIL | COLD <150F | NO HT | HT TO ENG | HT TO ENG [NO HT] |
|  | OPERATIONAL 150-220F | HT TO CAT | NO HT | HT TO ENG [NO HT] |
|  | OVER TEMPERATURE >240F | HT TO CAT | HT TO CAT | NO HT |

FIG. 12A

|  |  | INLET TO THE LIGHT-OFF CATALYST | | |
| --- | --- | --- | --- | --- |
|  |  | COLD <800F | OPERATIONAL 800-1650F | OVER TEMPERATURE >1650F |
| ENGINE COOLANT | COLD <150F | NO HT | HT TO ENG | HT TO ENG [NO HT] |
|  | OPERATIONAL 150-220F | HT TO CAT | NO HT | HT TO ENG [NO HT] |
|  | OVER TEMPERATURE >220F | HT TO CAT | HT TO CAT | NO HT |

FIG. 12B

|  |  | INLET TO THE LIGHT-OFF CATALYST | | |
| --- | --- | --- | --- | --- |
|  |  | COLD <800F | OPERATIONAL 800-1650F | OVER TEMPERATURE >1650F |
| TRANSMISSION OIL | COLD <150F | NO HT | HT TO TRANS | HT TO TRANS [NO HT] |
|  | OPERATIONAL 150-220F | HT TO CAT | NO HT | HT TO TRANS [NO HT] |
|  | OVER TEMPERATURE >240F | HT TO CAT | HT TO CAT | NO HT |

FIG. 12C

|  |  | INLET TO THE LEAN NOx TRAP | | |
|---|---|---|---|---|
|  |  | COLD <500F | OPERATIONAL 500-1100F | OVER TEMPERATURE >1100F |
| ENGINE OIL | COLD <150F | NO HT | HT TO ENG | HT TO ENG |
|  | OPERATIONAL 150-220F | HT TO CAT | NO HT | HT TO ENG |
|  | OVER TEMPERATURE >240F | HT TO CAT | HT TO CAT | NO HT |

FIG. 12D

|  |  | INLET TO THE LEAN NOx TRAP | | |
|---|---|---|---|---|
|  |  | COLD <500F | OPERATIONAL 500-1100F | OVER TEMPERATURE >1100F |
| ENGINE COOLANT | COLD <150F | NO HT | HT TO ENG | HT TO ENG |
|  | OPERATIONAL 150-220F | HT TO CAT | NO HT | HT TO ENG |
|  | OVER TEMPERATURE >220F | HT TO CAT | HT TO CAT | NO HT |

FIG. 12E

|  |  | INLET TO THE LEAN NOx TRAP | | |
|---|---|---|---|---|
|  |  | COLD <500F | OPERATIONAL 500-1100F | OVER TEMPERATURE >1100F |
| TRANSMISSION OIL | COLD <150F | NO HT | HT TO TRANS | HT TO TRANS |
|  | OPERATIONAL 150-220F | HT TO CAT | NO HT | HT TO TRANS |
|  | OVER TEMPERATURE >240F | HT TO CAT | HT TO CAT | NO HT |

FIG. 12F

|  |  | INLET TO THE MID-BED UNDER BODY OF THREE-WAY CATALYST | | |
|---|---|---|---|---|
|  |  | COLD <800F | OPERATIONAL 800-1650F | OVER TEMPERATURE >1650F |
| ENGINE OIL | COLD <150F | NO HT | HT TO ENG | HT TO ENG |
|  | OPERATIONAL 150-220F | HT TO CAT | NO HT | HT TO ENG |
|  | OVER TEMPERATURE >240F | HT TO CAT | HT TO CAT | NO HT |

FIG. 12G

|  |  | INLET TO THE MID-BED UNDER BODY OF THREE-WAY CATALYST | | |
|---|---|---|---|---|
|  |  | COLD <500F | OPERATIONAL 500-1100F | OVER TEMPERATURE >1100F |
| ENGINE COOLANT | COLD <120F | NO HT | HT TO ENG | HT TO ENG |
|  | OPERATIONAL 150-220F | HT TO CAT | NO HT | HT TO ENG |
|  | OVER TEMPERATURE >220F | HT TO CAT | HT TO CAT | NO HT |

FIG. 12H

|  |  | INLET TO THE MID-BED UNDER BODY OF THREE-WAY CATALYST | | |
|---|---|---|---|---|
|  |  | COLD <500F | OPERATIONAL 500-1100F | OVER TEMPERATURE >1100F |
| TRANSMISSION OIL | COLD <150F | NO HT | HT TO TRANS | HT TO TRANS |
|  | OPERATIONAL 150-220F | HT TO CAT | NO HT | HT TO TRANS |
|  | OVER TEMPERATURE >240F | HT TO CAT | HT TO CAT | NO HT |

FIG. 12I

|  |  | INLET TO THE MUFFLER POSITION | | |
|---|---|---|---|---|
|  |  | COLD <250F | OPERATIONAL 250-1200F | OVER TEMPERATURE >1200F |
| ENGINE OIL | COLD <150F | NO HT | HT TO ENG | HT TO ENG |
|  | OPERATIONAL 150-220F | HT TO CAT | NO HT | HT TO ENG |
|  | OVER TEMPERATURE >240F | HT TO CAT | HT TO CAT | NO HT |

FIG. 12J

|  |  | INLET TO THE MUFFLER POSITION | | |
|---|---|---|---|---|
|  |  | COLD <250F | OPERATIONAL 250-1200F | OVER TEMPERATURE >1200F |
| ENGINE COOLANT | COLD <120F | NO HT | HT TO ENG | HT TO ENG |
|  | OPERATIONAL 150-220F | HT TO CAT | NO HT | HT TO ENG |
|  | OVER TEMPERATURE >220F | HT TO CAT | HT TO CAT | NO HT |

FIG. 12K

|  |  | INLET TO THE MUFFLER POSITION | | |
|---|---|---|---|---|
|  |  | COLD <250F | OPERATIONAL 250-1200F | OVER TEMPERATURE >1200F |
| TRANSMISSION OIL | COLD <150F | NO HT | HT TO TRANS | HT TO TRANS |
|  | OPERATIONAL 150-220F | HT TO CAT | NO HT | HT TO TRANS |
|  | OVER TEMPERATURE >240F | HT TO CAT | HT TO CAT | NO HT |

FIG. 12L

|  |  | TRANSMISSION | | |
|---|---|---|---|---|
|  |  | COLD <150F | OPERATIONAL 150-220F | OVER TEMPERATURE >220F |
| ENGINE OIL | COLD <150F | NO HT | HT TO ENG | HT TO ENG |
|  | OPERATIONAL 150-220F | HT TO TRANS | NO HT | HT TO ENG |
|  | OVER TEMPERATURE >240F | HT TO TRANS | HT TO TRANS | NO HT |

FIG. 12M

|  |  | TRANSMISSION | | |
|---|---|---|---|---|
|  |  | COLD <150F | OPERATIONAL 150-220F | OVER TEMPERATURE >220F |
| ENGINE COOLANT | COLD <150F | NO HT | HT TO ENG | HT TO ENG |
|  | OPERATIONAL 150-220F | HT TO TRANS | NO HT | HT TO ENG |
|  | OVER TEMPERATURE >220F | HT TO TRANS | HT TO TRANS | NO HT |

FIG. 12N

|  |  | ENGINE COOLANT | | |
|---|---|---|---|---|
|  |  | COLD <150F | OPERATIONAL 150-220F | OVER TEMPERATURE >220F |
| ENGINE OIL | COLD <150F | NO HT | HT TO ENGINE OIL | HT TO ENGINE OIL |
|  | OPERATIONAL 150-220F | HT TO COOLANT | NO HT | HT TO ENGINE OIL |
|  | OVER TEMPERATURE >240F | HT TO COOLANT | HT TO COOLANT | NO HT |

FIG. 12O

ENGINE SYSTEM INCLUDING HEAT PIPE

BACKGROUND SUMMARY

Thermal management of an engine system for a vehicle may present various challenges. For example, at lower temperature conditions, such as after a cold start of the engine, the engine and/or transmission may experience greater drag due to reduced effectiveness of the lubricating fluids at lower temperatures. This drag may result in reduced efficiency of the vehicle and/or greater emissions. As another example, heating of the passenger cabin may be delayed during the engine warm-up phase until the engine coolant reaches a temperature where cabin heating may be performed. In still another example, various components and/or fluids of the engine system may experience degradation if their respective temperature exceeds a particular threshold. Still other challenges exist.

In one approach, some of the above issues may be addressed by An engine system for a vehicle, comprising an engine producing exhaust gases; an exhaust passage for transporting the exhaust gases to a surrounding environment; a first heat pipe having a first end in thermal contact with the exhaust passage and a second end in thermal contact with a first fluid of the engine system; a second heat pipe having a first end in thermal contact with the exhaust passage and a second end in thermal contact with a second fluid of the engine system; wherein the first heat pipe is configured to provide increased heat transfer between the exhaust passage and the first fluid during at least a first temperature condition and the second heat pipe is configured to provide increased heat transfer between the second fluid and the exhaust passage during at least a second temperature condition different than the first temperature condition.

In another approach, some of the above issues may be addressed by a method of transferring heat throughout an engine system for a vehicle, the method comprising during a first condition, increasing an amount of heat transferred between a first region of the engine system and a second region of the engine system via a first heat pipe path; and during a second condition, increasing an amount of heat transferred between a third region of the engine system and a fourth region of the engine system via a second heat pipe path.

In yet another approach, some of the above issues may be addressed by a heat pipe for an engine system of a vehicle, comprising a base thermally coupled to a first region of the engine system, said base forming a boiler; a first elongate branch having a first end coupled to the base and an opposite second end in thermal communication with a second region of the engine system, said second end forming a first condenser; a second elongate branch having a first end coupled to the base and an opposite second end in thermal communication with a third region of the engine system, said second end forming a second condenser; wherein the base, first elongate branch, and second elongate branch share a common volume of working fluid.

BRIEF DESCRIPTION OF THE DRAWINGS

FIGS. 3-5 illustrate alternative heat pipe configurations.

FIGS. 10 and 11 illustrate potential heat transfer directions that may be achieved with one or more heat pipes.

FIG. 12 illustrates various mode tables that may be used to achieve rapid heating of the engine system components.

DETAILED DESCRIPTION

The present disclosure is directed toward the application of heat transfer elements, which may be referred to as heat pipes, for facilitating the exchange of thermal energy among various engine system components. Heat pipes may be used to achieve a substantially high rate of heat transfer without necessarily requiring the use of pumps or other mechanical components. Further, these heat pipes may be configured to provide heat transfer within a particular temperature range, thereby enabling the level of heat transfer to be adjusted without requiring input from a control system, although adjustment via input from a control system may be advantageously used.

In one approach, more rapid vehicle heating may be achieved by the staging of heat transfer events. As one example, during an engine warm-up period, the temperature of the catalyst, passenger cabin, and/or mechanical lubrication systems may be heated in a coordinated manner. In another approach, one or more heat pipes may be configured to protect some components or fluids of the engine system from thermal degradation or to maintain the component or fluid with a prescribed temperature range that provides improved operation.

Figure 1:
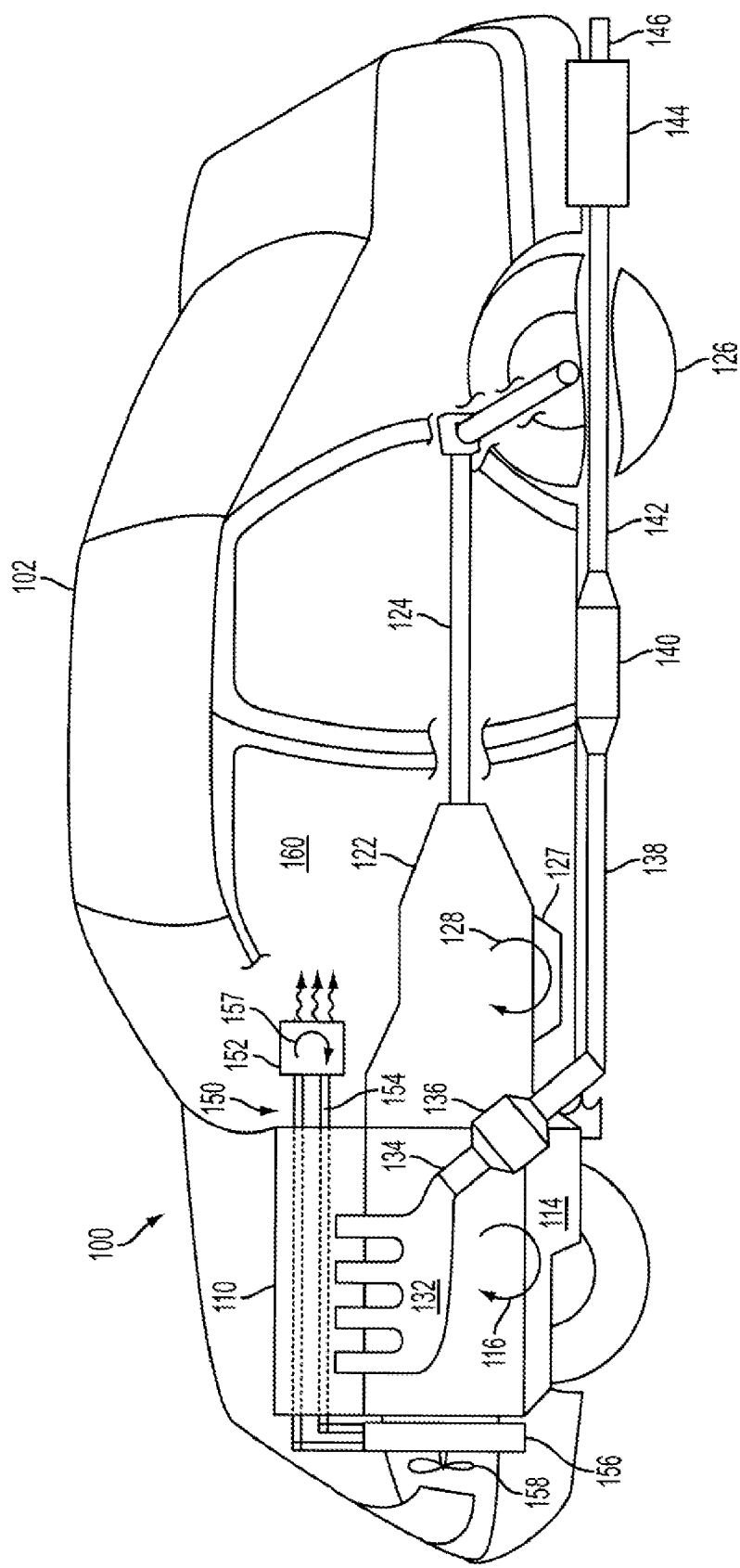
FIG. 1 illustrates an example engine system for a vehicle.

FIG. 1 illustrates an example engine system 100 configured in an automobile 102. Engine system 100 includes an engine 110. Engine 110 may include an internal combustion engine having one or more cylinders. Alternatively, engine 110 may include an external combustion engine, rotary engine, or other suitable engine. Engine 110 can generate mechanical work via combustion of a fuel. The mechanical work generated by engine 110 can be transferred to at least one drive wheel 126 via a transmission 122 and drive shaft 124, among other components. Exhaust gases produced by engine 112 via combustion of fuel may be transported away from the engine via exhaust system 130.

Exhaust system 130 may include an exhaust manifold 132 for combining the flow of a plurality of combustion chambers into at least one exhaust passage 134. Exhaust system 130 may include one or more exhaust aftertreatment devices 136, 140, and/or 144. In this particular embodiment, a first aftertreatment device 136 includes a light-off catalyst, a second aftertreatment device 140 includes a lean NOx trap or three-way catalyst, and device 144 includes a muffler. It should be appreciated that additional or other suitable types or quantities of aftertreatment devices may be used including one or more of a particulate filter, NOx trap, SOx trap, catalyst, mufflers, etc., among others. Device 136 and 140 may communicate via exhaust passage 138 and device 140 and 144 may communicate via exhaust passage 142. A tailpipe 146 enables exhaust gases to flow from the exhaust system to the surrounding environment.

Engine 112 may utilize an engine oil to provide lubrication and/or cooling of mechanical interfaces and may utilize an engine coolant to provide additional cooling of the engine. Engine 112 may include an oil pan 114 for collecting engine oil where it may be recirculated to the engine via a pump, for example, as indicated by 116. Engine coolant may be circulated through or around engine 112 via a coolant system 150. Coolant system 150 may include one or more coolant passages 154 coupling a radiator 156 and/or a heating box 152. Heating box 152 can provide heated air to a passenger cabin 160 via circulation of engine coolant, as indicated by 157. Radiator 156 may include a fan 158 that can be controlled to provide increased heat transfer from the radiator to the surrounding environment.

Transmission 122 may utilize a transmission oil to provide lubrication and/or cooling of the various mechanical interfaces. Transmission 122 may include an oil pan 127 for collecting transmission oil where it may be recirculated back into the transmission as indicated by 128, for example, via one or more pumps.

Engine system 100 may include more or less components than described above with reference to FIG. 1. As will be described below in greater detail, engine system 100 may include one or more heat pipes for transferring heat between two or more components of the engine system.

While heat exchangers utilizing an active pumping mechanism may be used for transferring heat among two or more components and/or fluids of the engine system, they may nonetheless add increased expense and/or complexity to the engine system, may utilize additional monitoring of component temperatures, and may use additional energy to affect the transfer of heat, such as via a mechanical pump.

Figure 2:
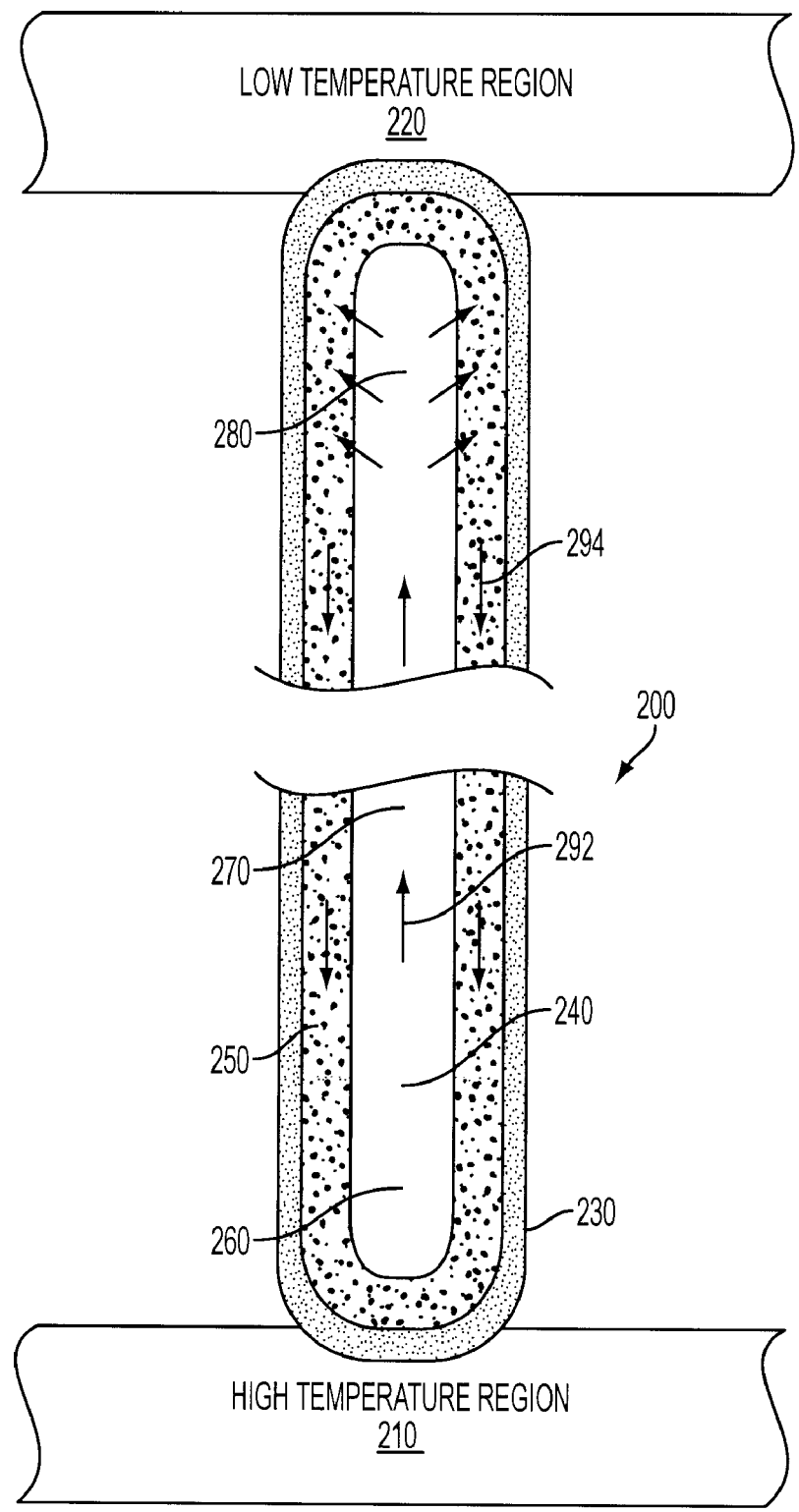
FIG. 2 illustrates an example heat pipe.
Figure 9:
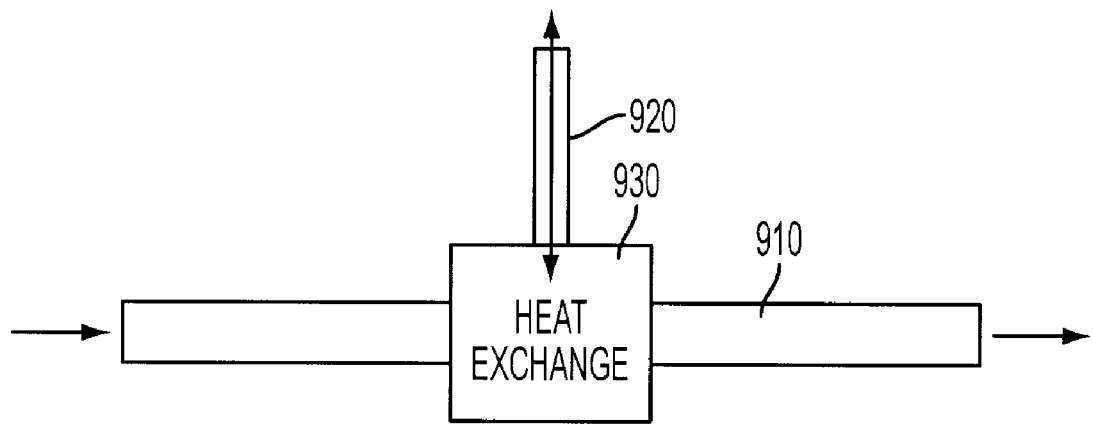
FIG. 9 illustrates an example interface for a heat pipe and an engine system component.

In some conditions, a heat pipe may be used to facilitate heat transfer between two or more regions of the engine system having a temperature difference without necessarily requiring additional temperature monitoring or mechanical pumping. FIG. 2 illustrates a section view of an example heat pipe 200 for transferring heat between a first region 210 and a second region 220. Regions 210 and 220 may include any two regions or components of engine system 100 described above. In this particular example, region 210 is of a higher temperature than region 220. Heat pipe 200 includes an elongate casing 230 having a first end in thermal contact (e.g. thermal communication) with region 210 and a second end in thermal contact with region 220. As described herein, thermal contact or thermal communication may include a physical coupling of the component and heat pipe as indicated in FIG. 2 or may include an intermediate heat exchanger as indicated in FIG. 9, for example. Continuing with FIG. 2, casing 230 serves as a substantially sealed vessel in which a working fluid resides. The heat pipe can transfer heat between the higher temperature region 210 and the lower temperature region 220 via migration of the vaporized working fluid that is condensed at the condenser end of the heat pipe.

During some conditions, such as when region 210 is of a sufficiently high temperature, the working fluid may be vaporized or boiled at a boiler end of the heat pipe as indicated by 260. The vaporized working fluid may migrate along an inner passage 240 as indicated by vector 292 where it may be condensed at a condenser end of the heat pipe as indicated by 280. In some embodiments, the heat pipe may include a wick material 250 that facilitates the return of the condensed working fluid as indicated by vector 294 via capillary action. The wick material may include a sintered metal powder and/or a series of grooves substantially parallel to the longitudinal axis of the heat pipe. Alternatively, the wick material may include any suitable material or arrangement of material for promoting capillary action of the condensed working fluid. The capillary action promoted by the wick material can be used to enable the fluid to overcome the gravitational force, for example, where the condensed fluid must travel against the force of gravity due to the orientation of the heat pipe. However, in alternative embodiments, the heat pipe may not necessarily include wick material. In this way, the working fluid may be cycled between a warmer region and a cooler region, transferring heat along with it.

A heat pipe, as shown in FIG. 2, may utilize evaporative cooling to transfer thermal energy from the boiler end (e.g. 260) to the condenser end (e.g. 280) by the evaporation and condensation of the working fluid. When the boiler end of the heat pipe is heated the working fluid inside the pipe at that end evaporates and increases the vapor pressure inside the cavity of the heat pipe. The latent heat of evaporation absorbed by the vaporization of the working fluid reduces the temperature at the hot end of the pipe. The vapor pressure in the vicinity of the liquid working fluid at the boiler end of the pipe is higher than the equilibrium vapor pressure in the vicinity of the condensing working fluid at the condenser end of the pipe, and this pressure difference drives a rapid mass transfer to the condensing end where the excess vapor releases its latent heat, warming the cool end of the pipe. In this way, a heat pipe may be able to transfer heat at a rate substantially higher than by conduction processes.

Operation of the heat pipe may be governed by the selection of the particular working fluid or fluids used therein. For example, where the higher temperature region (e.g. 210) is at a temperature that is lower than the boiling point of each substance of the working fluid, the heat pipe may transfer a relatively small amount of heat via conduction along the casing of the heat pipe. Where the higher temperature region attains or surpasses the boiling point of at least one substance of the working fluid, the heat pipe may begin transferring heat via migration of the working fluid or a substance thereof from the boiler end to the condenser end as described above, thereby substantially increasing the rate of heat transfer between the higher temperature region and the lower temperature region. Where the higher temperature region exceeds an upper threshold temperature, the working fluid may be completely vaporized, thereby causing the migration of the working fluid to lessen or to stagnate, which reduces the heat transfer to conduction along the casing.

The working fluid of the heat pipe may contain one or more substances. As one non-limiting example, the working fluid may comprise one or more substances including water, ethanol, methanol, mercury, coolant, or other suitable fluid. By selecting an appropriate substance or mixture of substances for the working fluid, a suitable temperature window at which the heat pipe transfers heat by migration of the working fluid may be achieved. In this way, a heat pipe may be configured to transfer heat at a substantially higher rate during some conditions (e.g. between boiling temperature and stagnation temperature) and transfer heat at a substantially lower rate (e.g. via conduction) during other conditions.

In one example, a plurality of working fluids may be used to provide additional heat pipe functions. For example, two different working fluids may be used to provide different heat transfer properties, such as heat transfer temperature ranges, heat transfer amounts, etc. In one example, the two different fluids have different physical properties selected so that the heat pipe has different heat transfer characteristics at different conditions depending on the physical properties of the working fluids. As another example, the curve for the amount of heat transfer for a given temperature may be shaped by appropriate selection of two or more working fluids in the heat pipe.

Heat pipe 200 may have a shape other than the straight elongate element shown in FIG. 2. FIG. 3A, illustrates an example heat pipe for transferring heat between regions 310 and 320. In this particular example, the heat pipe may include a casing having a plurality of segments indicated by 330, 332, and 334 for transferring the working fluid via internal passage 370. FIG. 3B, illustrates another example heat pipe for transferring heat from a high temperature region 310 to a lower temperature region 320 via a flexible casing 340 coupling the boiler end 336 to the condenser end 338, enabling the working fluid to flow via internal passage 372. Thus, the various heat pipe examples described herein may be configured to provide heat transfer between two regions of engine system 100 without necessarily requiring that the regions be accessible via a linear path. In this way, heat may be transferred between any two suitable regions or components of the engine system.

FIGS. 4 and 5 illustrate heat pipes that may be used in system 100 having multiple branches joined by a base end and sharing a common working fluid. By utilizing a heat pipe having two or more branches, a heat source having a limited size or space may be able to transfer heat to two or more different regions. Further, the use of a heat pipe having multiple branches can be used to reduce the size and/or quantity of interfaces between the boiler and the heat source.

As one example, FIG. 4A illustrates a section view of a heat pipe 400 that may be used to transfer heat from a higher temperature region 410 to two lower temperature regions 420 and 422. In this particular example, heat pipe 400 includes casing including a lower portion 430 and two branch portions 432 and 434. Similar, the internal passage 470 may branch into two separate internal passages 472 and 474. In this manner, a heat pipe may include a single boiler and two condensers that can enable a single heat pipe to facilitate the transfer of heat from a single heat source to two or more cooler regions. It should be appreciated that low temperature regions 420 and 422 may be at the same or different temperatures and may be part of the same or different component of the engine system. For example, region 420 may include an engine fluid such as engine oil or engine coolant and region 422 may include a transmission fluid such as the transmission oil. Alternatively, regions 420 and 422 may both be thermal coupled to the same component, such as the engine coolant system, for example.

FIG. 4B illustrates an alternative embodiment of the heat pipe of FIG. 4A, showing how at least two of the branches may be of different size and/or shape. In this manner, more or less heat may be transferred between regions 410/420 and regions 410/422 depending on the relative size and shape of each branch. Further, different regions or components of the engine system may be accessible by each branch. FIG. 4C illustrates an end view of the heat pipe illustrated in FIG. 4A for providing greater clarification of the particular heat pipe configuration.

FIG. 5A illustrates a section view of an example heat pipe 500 having three separate branches for facilitating the heat transfer between a higher temperature region 510 and three lower temperature regions 520, 530, and 540. As one example, region 510 may be thermally coupled to a region of the exhaust system while regions 520, 530, and 540 may communicate thermally with the engine oil, engine coolant, and transmission oil, respectively. FIG. 5B shows an end view of example heat pipe 500. As similarly indicated above with reference to FIGS. 4A-4C, lower temperature regions may be at the same or different temperature and may include the same or different element of the engine system. Further, one or more of the branches may be the same or different size and shape as other branches. Further still, it should be appreciated that a heat pipe may include greater numbers of branches.

Figure 6A:
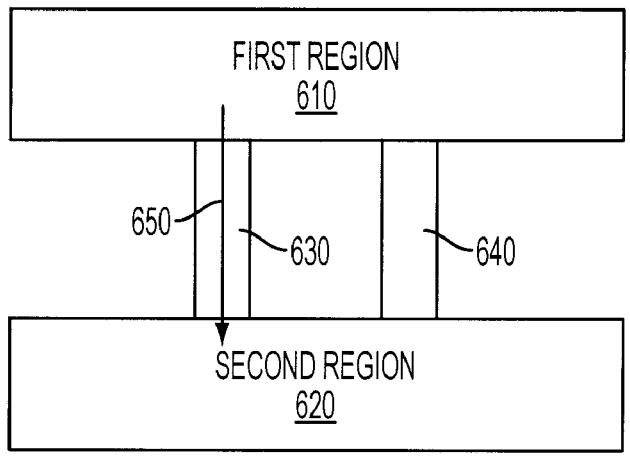
FIG. 6 illustrates various bi-directional heat transfer conditions via two heat pipes.
Figure 6B:
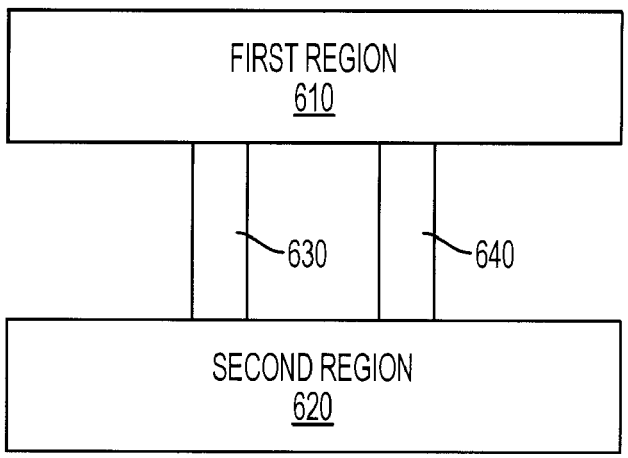
Figure 6C:
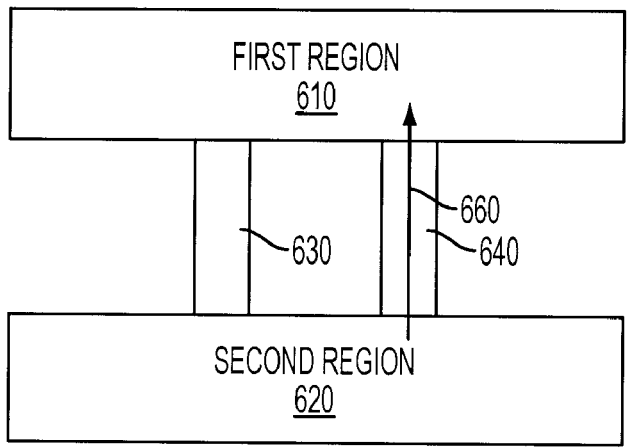

FIGS. 6A, 6B, and 6C illustrate an example where at least two separate heat pipes may be configured to provide bi-directional heat transfer based on the particular operating conditions. In each of FIGS. 6A, 6B, and 6C, heat pipes 630 and 640 are arranged between first region 610 and second region 620. In this particular example, heat pipe 630 includes a different working fluid that heat pipe 640 so that they transfer heat differently during different conditions. As one example, heat pipe 630 may include a working fluid such as ethanol and heat pipe 640 may include a working fluid such as water.

FIG. 6A illustrates a first condition where the first region 610 has a higher temperature than the second region 620. Further, FIG. 6A illustrates an example where the first region 610 is of a temperature greater than the boiling point of the working fluid of heat pipe 630, but less than the boiling point of the working fluid of heat pipe 640 and is less than the stagnation temperature of heat pipe 630. Thus, during the condition of FIG. 6A, heat is transferred from higher temperature region 610 to lower temperature region 620 via heat pipe 630 as indicated by vector 650, while heat pipe 640 transfers substantially less heat (e.g. via conduction).

FIG. 6B illustrates a second condition where the temperatures of the first and second regions are below the boiling points of both working fluids of heat pipes 630 and 640. In this condition, substantially no heat is transferred between the first and second regions (e.g. via conduction).

FIG. 6B further illustrates a third condition where the temperatures of the first and second regions are substantially similar and are within an operating range of at least one of heat pipes 630 and 640. During this condition, substantially no heat may be transferred between region 610 and 620, since there is no temperature gradient.

FIG. 6B further illustrates a fourth condition where the temperature of the first region is greater than the temperature of the second region, and where the temperature of the first region is greater than the stagnation temperature of heat pipe 630 and less than the boiling point of heat pipe 640. During this condition, substantially no heat may be transferred between regions 610 and 620 since neither working fluid is within the particular temperature range.

FIG. 6B further illustrates a fifth condition where the temperature of the first region and/or second region are greater than the stagnation temperature of both of heat pipes 630 and 640. During this condition, substantially no heat may be transferred between regions 610 and 620.

FIG. 6C illustrates a sixth condition, where the second region 620 has a greater temperature than the first region 610, and where the temperature of region 620 is greater than the stagnation temperature of heat pipe 630 and is between the boiling point and stagnation temperature of heat pipe 640. During this condition, heat may be transferred from region 620 to 610 via heat pipe 640 as indicated by vector 660.

Thus, one or more of the above conditions may be achieved by selecting a suitable working fluid for each of heat pipes 630 and 640 and a suitable location within the engine and/or vehicle system for the location of the heat pipe end regions. For example, heat pipe 630 in the above examples included a working fluid having a lower temperature range than the working fluid of heat pipe 640 (e.g. ethanol and water, respectively). In this way, heat may be transferred in a first direction where a temperature gradient exists between two regions and where the higher temperature region is within the temperature range of one of the two heat pipes. During a different condition, such as where the heat gradient is in the opposite direction and the higher temperature region is within the temperature range of the other of the two heat pipes, heat may be transferred in the opposite direction.

The first region 610 and second region 620 may include any suitable pair of engine system components as described herein. As one example, region 610 may include one of an exhaust system component (e.g. a catalyst, aftertreatment device, exhaust passage, etc.) and region 620 may include an engine system fluid (e.g. engine oil, engine coolant, transmission oil, etc.). Alternatively, region 620 may include one of an exhaust system component (e.g. a catalyst, aftertreatment device, exhaust passage, etc.) and region 610 may include an engine system fluid (e.g. engine oil, engine coolant, transmission oil, etc.). As yet another example, region 610 may include one of the engine oil, engine coolant, and transmission oil and region 620 may include another of the engine oil, engine coolant, and transmission oil. Thus, heat may be transferred bi-directionally between two or more components or regions of the engine system or between the engine system and other vehicle systems.

Figure 7:
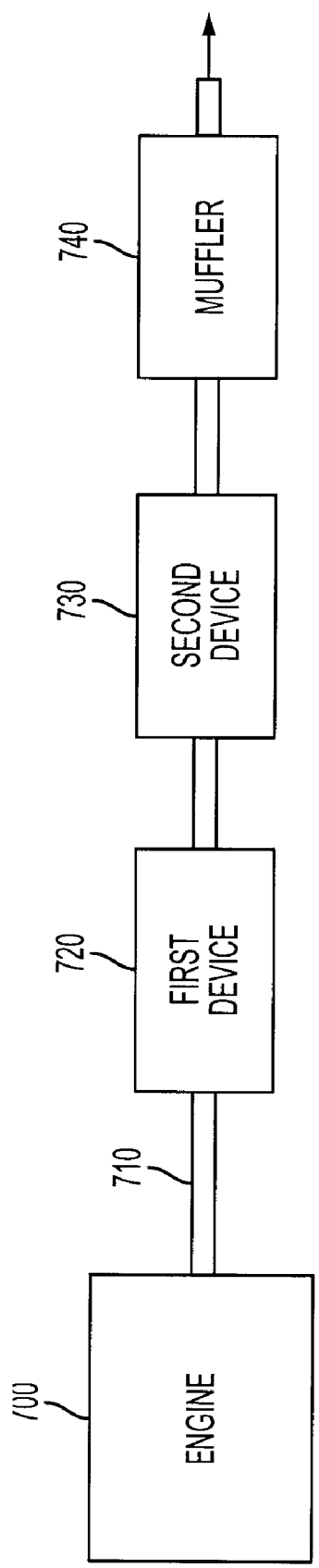
FIG. 7 illustrates a simplified generic view of an exhaust system for an engine.

FIG. 7 illustrates a schematically simplified version of an example exhaust system for an engine, for example, as described above with reference to FIG. 1. Engine 700 produces exhaust gases that may be transported to the surrounding environment via exhaust passage 710. The exhaust system may include one or more aftertreatment devices such as 720 and 730 for treating the exhaust gases before they are discharged as well as a muffler 740. As one example, first device 720 may include one of a light-off catalyst, a three-way catalyst, a NOx trap, a SOx trap, a particulate filter, or other suitable exhaust aftertreatment device. Further, second device 720 may include one of a light-off catalyst, a three-way catalyst, a NOx trap, a SOx trap, a particulate filter, or other suitable exhaust aftertreatment device. While FIG. 7 provides a basic illustration for understanding FIGS. 8-11, it should be appreciated that the approaches described herein are applicable to the engine system of FIG. 1.

Figure 8:
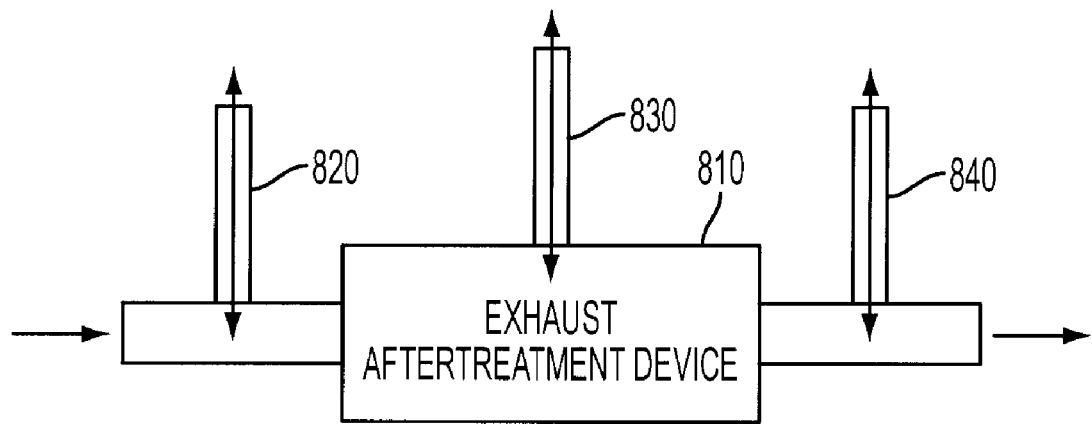
FIG. 8 illustrates various heat pipe configurations for an exhaust system component.

FIG. 8 illustrates a portion of an exhaust system, for example, as described above with reference to FIG. 7. In this example, an exhaust aftertreatment device 810 is arranged along an exhaust passage of the engine system. Device 810 may include any suitable exhaust aftertreatment device, for example, as described with reference to devices 720 or 730. In this particular example, various components of the exhaust system may serve as a high and/or low temperature region for one or more heat pipes. For example, FIG. 8 illustrates schematically how one or more heat pipe 820 may be thermally coupled to the exhaust passage upstream of device 810. Thus, heat may be transferred in one direction as described with reference to FIG. 2 or bi-directionally as described with reference to FIG. 6 with another component of the engine system during at least some temperature conditions. Alternatively or in addition, at least one heat pipe 830 may be thermally coupled to device 810. Thus, heat may be transferred in one direction as described with reference to FIG. 2 or bi-directionally as described with reference to FIG. 6 with another component of the engine system during at least some temperature conditions. Alternatively or in addition, at least one heat pipe 840 may be thermally coupled upstream of device 810. Thus, heat may be transferred in one direction as described with reference to FIG. 2 or bi-directionally as described with reference to FIG. 6 with another component of the engine system during at least some temperature conditions.

In this manner, heat may be transferred from or to the exhaust system to affect the temperature of an exhaust device in different ways. For example, heat pipes 820 and/or 830 can be used to provide heat transfer to or from device 810, while heat pipe 840 arranged downstream of device 810 may be used to add or remove heat from the exhaust system with less effect to the temperature of device 810.

FIG. 9 illustrates a non-limiting example of how a heat pipe may be thermally coupled to a component or region of the engine system. In this example, one or more heat exchangers 920 may be thermally coupled to an exhaust passage 910 or other component or region via a heat exchanger 930. As one example, the exhaust passage 910 may include internal fins for facilitating the transfer of heat to or from the exhaust gases by way of the heat pipe. However, it should be appreciated that any suitable heat exchanger may be used to facilitate heat transfer between a component of the engine system and a heat pipe. As another example, a heat exchanger may be used to transfer heat between the engine oil, engine coolant, or transmission oil and a heat pipe. Further, in some embodiments, a heat pipe may be thermally coupled to an engine system component without an intermediate heat exchanger.

FIG. 10 illustrates schematically, several examples showing how heat may be transferred between various regions of the engine system. While the various regions or components illustrated in FIG. 10 are described with reference to FIG. 7, it should be appreciated that any suitable region of the engine system may serve as a heat source or heat sink for a heat pipe.

FIG. 10A, for example, illustrates how heat may be transferred between the engine oil and one or more regions of the exhaust system in a single direction or by a bi-directional approach as described with reference to FIG. 6. For example, FIG. 10A illustrates how heat may be transferred from the exhaust passage before a first aftertreatment device to engine oil or vice versa, between the first device and the engine oil, the exhaust passage between the first and second devices and the engine oil, between the second device and the engine oil, and/or between the exhaust passage after the second aftertreatment device and the engine oil. Thus, one or more of the directions of heat transferred illustrated in FIG. 10A may be achieved by one or more heat pipes described above with reference to FIGS. 2-6.

FIGS. 10B and 10C illustrate how heat may be similarly transferred to other fluids including the engine coolant and transmission oil, respectively.

Figure 11:
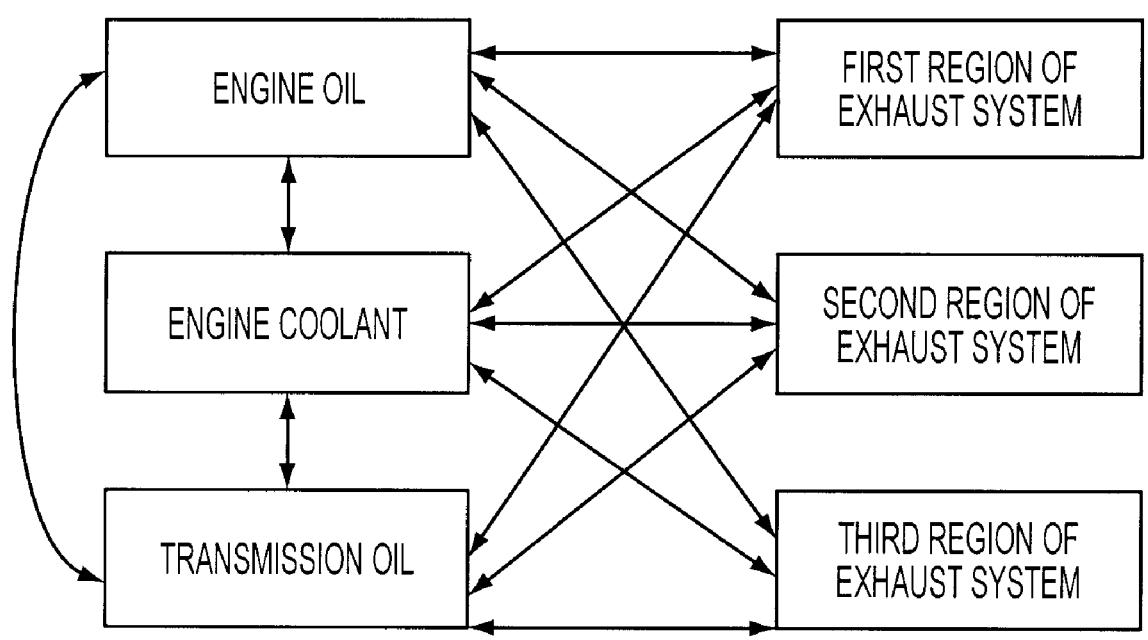

FIG. 11 illustrates how heat may be additionally or alternatively transferred between several different regions of the exhaust system and various engine system fluids. For example, a first region of the exhaust system may transfer heat to one or more of the engine oil, engine coolant, and transmission oil, and/or one or more of the engine oil, engine coolant, and may transfer heat to the first region of the exhaust system via one or more heat pipes. Similarly, a second and/or third region of the exhaust system may transfer heat to or from one or more of the engine oil, engine coolant, and transmission oil via one or more heat pipes. Further, heat may be transferred between the engine oil and the engine coolant, between the engine coolant and the transmission oil, and/or between the engine oil and transmission oil via one or more heat pipes.

Further, with reference to FIGS. 10 and 11, where a single region serves as a heat source or heat sink for two or more other regions, a multiple branch heat pipe may be used as described with reference to FIG. 4, or multiple individual heat pipes may be used. Further still, where the flow of heat is bi-directional, at least two separate heat pipes may be used having different working fluids to facilitate the transfer of heat during different operating conditions, for example, as described with reference to FIG. 6. In this way, one or more of the heat transfer options indicated in FIGS. 10 and 11 may be configured to occur at different operating conditions.

FIG. 12 provides several example mode tables illustrating how heat may be transferred between different regions of the engine system based on the particular operating conditions of some of the engine system components.

FIG. 12A illustrates a non-limiting example of a mode table for a heat pipe arranged between a region of the exhaust passage upstream (i.e. before) a first aftertreatment device and the engine oil. For example, the first aftertreatment device may include a light off catalyst as described with reference to FIG. 1. Each of the mode tables of FIG. 12 including FIG. 12A provide an indication of an example direction of heat transfer for the given operating conditions.

FIG. 12A indicates three different operating conditions along the horizontal axis that are representative of temperature conditions at the first aftertreatment device and three different operating conditions along the vertical axis that are representative of temperature conditions of the engine oil. Where the table indicates "No Heat", substantially no heat will be transferred via the heat pipe, which may be achieved by selection of a suitable working fluid for the heat pipe or by the condition where no heat gradient is present. For example, where no heat transfer is to occur, the temperature range may be less than the boiling point of the working fluid or the temperature range may be greater than the stagnation temperature of the heat pipe. Where the table indicates "Heat to Engine Oil", heat may be transferred from the exhaust system before (e.g. upstream of) the first aftertreatment device, to the engine oil. Where the table indicates "Heat to Catalyst", heat may be transferred from the engine oil to the exhaust passage before the first aftertreatment device, which in this particular example includes the light off catalyst, for example, as shown in FIG. 1.

As a first example, with regards to an inlet temperature of the light-off catalyst in the range of 800-1650° F. and engine oil at a temperature of less than 150° F., heat may be transferred from the exhaust passage upstream of the light-off catalyst (e.g. at the inlet to the catalyst) to the engine oil. This may be achieved, for example, via a single heat pipe having an operating range of at least between approximately 800-1650° F. The boiler end of the heat pipe may be thermally coupled to the exhaust passage upstream of the light-off catalyst and a condenser end may be thermally coupled to the engine oil pan, inlet or outlet of the engine oil filter, or other suitable location for transferring heat to the engine oil. However, as indicated by the example mode table of FIG. 12A, when the temperature of the exhaust passage upstream of the light-off catalyst is less than 800° F., there may be substantially no heat transferred to the engine oil at a temperature less than 150° F. This may be achieved by selecting a working fluid for the heat pipe that does not begin to vaporize until reaching a temperature of approximately 800° F. Thus, as can be seen, the mode tables of FIG. 12 can be applied to enable a suitable working fluid to be selected for a heat pipe.

As a second example, with regards to the inlet temperature of the light-off catalyst in the range of less than 800° F. and the temperature of the engine oil to be greater than 240° F., heat may be transferred from the engine oil to the exhaust passage upstream of the light-off catalyst, when the engine oil is of a greater temperature than the exhaust passage. However, when the temperature of the engine oil is less than 150° F. and the inlet temperature of the light-off catalyst is in the range of less than 800° F., substantially no heat may be transferred between the engine oil and the exhaust passage. This heat transfer condition may be achieved by a heat pipe having a working fluid that does not begin to vaporize until reaching a temperature of at least 150° F.

The first and second examples, described above with reference to FIG. 12A may both be achieved by utilizing at least two heat pipes having different working fluids, for example, as described above with reference to FIG. 6. In this manner, different heat conditions may be achieved by utilizing two or more heat pipes having working fluids suitable for the desired operating temperature range.

FIGS. 12B and 12C illustrate mode tables indicating the direction of heat transfer between the exhaust passage upstream of the first aftertreatment device and the engine coolant and transmission oil, respectively.

As another example, modes from different tables may be combined, for example, by utilizing a heat pipe having multiple branches. For example, the mode utilized where the condition of the engine oil is less than 150° F. and the temperature of the exhaust passage upstream of the light-off catalyst is greater than 1650° F. of FIG. 12A may be combined with the mode utilized where the condition of the transmission oil is less than 150° F. and the temperature of the exhaust passage upstream of the light-off catalyst is greater than 1650° F. of FIG. 12C, by a multiple branch heat pipe. A boiler end of the heat pipe may be thermally coupled to the exhaust passage, while a first branch having a condenser end may be in thermal contact with the engine oil and a second branch having a condenser end may be in thermal contact with the transmission oil. In this manner, a single heat pipe may be used to fulfill two or more operating modes of the mode tables illustrated by FIG. 12.

FIGS. 12D, 12E, and 12F illustrate mode tables indicating the direction of heat transfer between one of the engine oil, engine coolant, and transmission oil and the exhaust passage between a first aftertreatment device (e.g. a light off catalyst) and a second aftertreatment device (e.g. a lean NOx trap), for example, as described above with reference to FIG. 1.

FIGS. 12G, 12H, and 12I illustrate mode tables indicating the direction of heat transfer between one of the engine oil, engine coolant, and transmission oil and an aftertreatment device, for example, at or under the body of a three-way catalyst as described above with reference to FIG. 1.

FIGS. 12J, 12K, and 12L illustrate mode tables indicating the direction of heat transfer between one of the engine oil, engine coolant, and transmission oil and the exhaust passage after each of the aftertreatment devices, for example, at the inlet to the muffler as described above with reference to FIG. 1.

FIG. 12M illustrates a mode table indicating the direction of heat transfer between the engine oil and the transmission oil via one or more heat pipes. FIG. 12N illustrates a mode table indicating the direction of heat transfer between the engine coolant and the transmission oil via one or more heat pipes. FIG. 12O illustrates a mode table indicating the direction of heat transfer between the engine oil and the engine coolant via one or more heat pipes.

It should be appreciated that one or more of the mode tables of FIG. 12 may be used in part or in combination to achieve the desired heating operation of the engine system. Where heat transfer of a single direction has been indicated, heat transfer may be achieved via a single heat pipe. Where heat transfer has been indicated to be bi-directional, two or more heat pipes may be used. Where heat transfer is from a single region to two or more regions, multiple individual heat pipes or a heat pipe having multiple branches may be used. Further, it should be appreciated that the temperature ranges provided in the mode tables of FIG. 12 are non-limiting and are provided for illustrative purposes.

Several example scenarios further illustrating the approaches described herein are provided.

Figure 13:
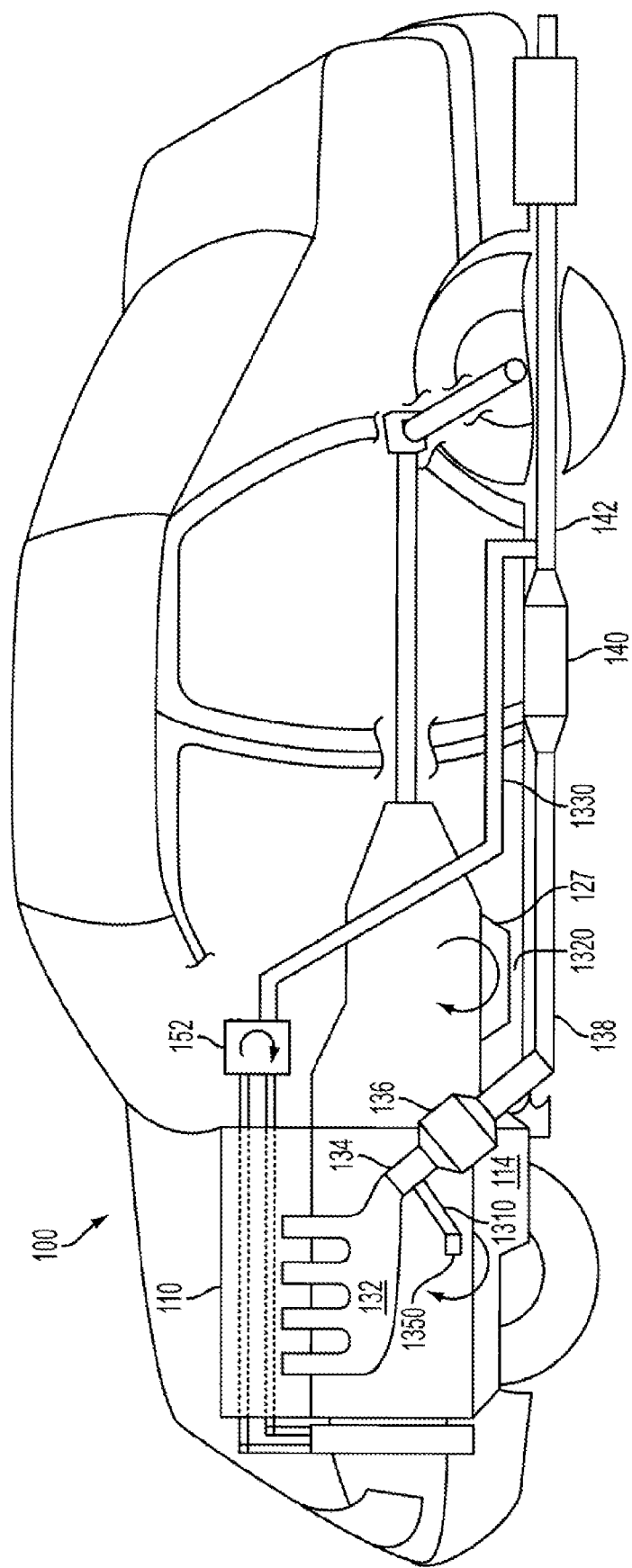
FIGS. 13-15 illustrate example engine systems having different heat pipe configurations.

As a first example scenario, as illustrated in FIG. 13, two or more heat pipes may be configured to perform staged heat transfer operations during different periods of an operating cycle of the engine system, for example, as directed by the mode tables of FIG. 12. FIG. 13 illustrates the engine system 100 of FIG. 1 including a plurality of heat pipes 1310, 1320, and 1330. While this particular example includes three heat pipes, it should be appreciated that more or less heat pipes may be used. Heat pipe 1310, for example, may be used to transfer heat between the inlet 134 to the light of catalyst 136, and the inlet to the oil filter as indicated by 1350. Heat pipe 1320 may be used to transfer heat from the exhaust passage 138 between devices 136 and 140, and the transmission oil pan or other suitable portion of the transmission (e.g. inlet to a thermostat (gate to radiator cooler for external regulators)). Heat pipe 1330, may be used to transfer heat between the exhaust passage 142, downstream of a second device 140 and the engine coolant system (e.g. via heating box 152).

For example, upon start-up of the engine from a cold condition, a first heat pipe (e.g. heat pipe 1320 and/or 1330) may be configured with a first working fluid that initially causes heat transfer from the exhaust gases downstream of at least one aftertreatment device to the engine oil, engine coolant, and/or transmission oil. Therefore, in this particular example, the working fluid may be selected to have an operating range (e.g. between boiling point and stagnation) that enables heat transfer at a temperature range that is existent during warm-up of the engine system. In this way, heating of engine or transmission fluids may be more rapidly achieved while not necessarily reducing the heat supplied by the exhaust gases to the aftertreatment device arranged upstream of the heat pipe. For example, heat pipe 1330 can transfer heat to the coolant system, where it may be used to heat the passenger cabin via heat exchanger 152. The first working fluid may also be selected so that the first heat pipe reaches a stagnation temperature when the engine system approaches or attains a warmed-up condition, thereby reducing heat transfer thereafter. In this manner, heat transfer from the exhaust system to one of the engine system fluids may be reduced at higher temperatures.

Further, a second heat pipe (e.g. 1310 and/or 1320) may be configured with a second working fluid that begins transferring heat from at least one of the engine oil, engine coolant, and transmission fluid to a region of the exhaust system upstream of or at an aftertreatment device where temperatures are at or above an engine warmed-up temperature condition. When the temperature of the aftertreatment device and at least one of the engine oil, engine coolant, and transmission oil are substantially similar (e.g. during steady state operation), substantially no heat will be transferred since there is little or no temperature gradient. However, if the exhaust heat provided to the aftertreatment device (e.g. via the engine exhaust gases) is reduced, the heat transferred to the aftertreatment device by the heat pipe may increase accordingly, thereby maintaining a suitable temperature at the aftertreatment device. As one example, during an engine shut-off operation or partial cylinder deactivation operation, the amount of exhaust heat may be reduced, which may otherwise cause a reduction in aftertreatment device temperature without use of additional heating via the heat pipe. In this way, one or more heat pipes may be used to maintain a suitable temperature of the various engine system components.

Figure 14:
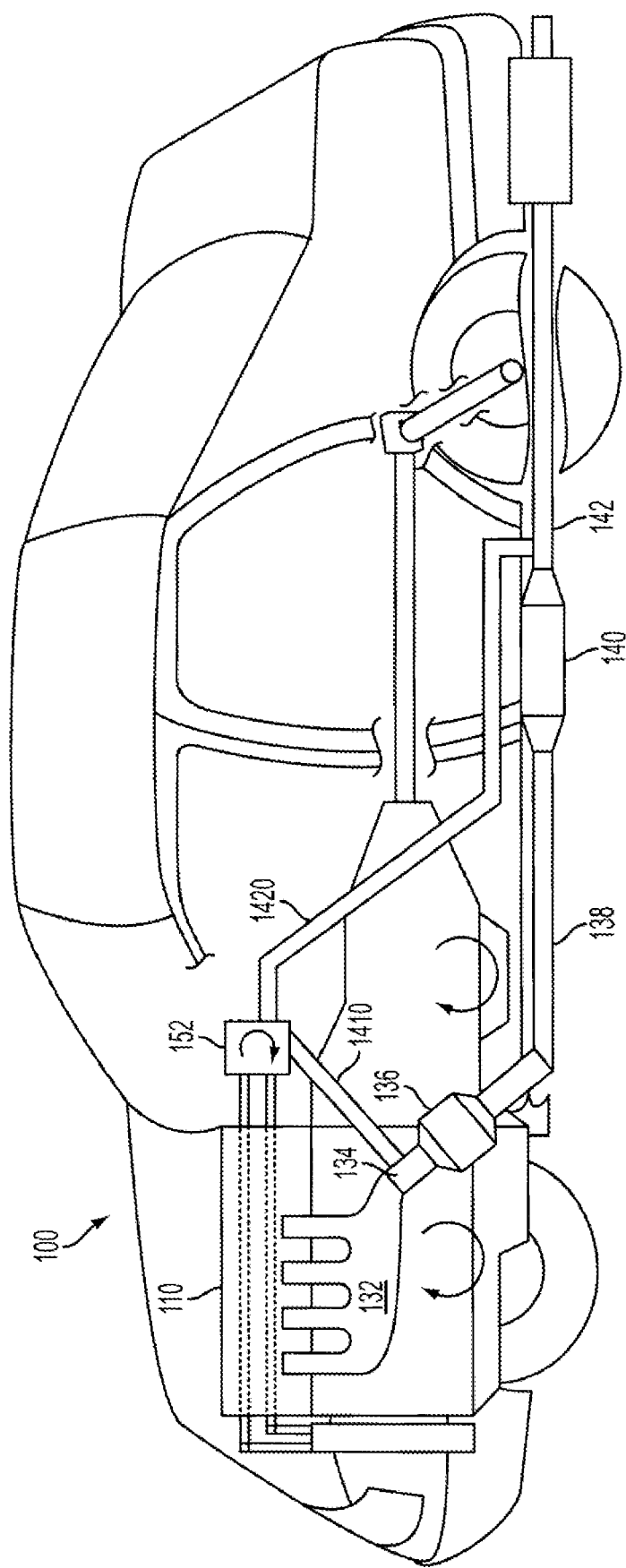

As a second example scenario, as illustrated in FIG. 14, a heat pipe (e.g. heat pipe 1410) arranged at or upstream of an aftertreatment device (e.g. 136 and/or 140) may include a working fluid that is selected to provide increased heat transfer away from the exhaust system during higher temperature conditions, thereby providing thermal protection of the aftertreatment device. For example, the working fluid may be selected so that it begins boiling at a temperature condition where cooling of the exhaust system is desired to protect the exhaust system components. As one example, heat may be transferred from the exhaust system to the engine coolant where it may be dissipated by the radiator via the coolant system. In this manner, various components of the exhaust system may be protected from thermal degradation. During cooler conditions, such as may occur during engine start-up or engine deactivation conditions, a second heat pipe (e.g. heat pipe 1420) can provide heat from the exhaust passage to the coolant system. In this manner, engine and/or passenger cabin heating may be improved during conditions such as start-up or warm-up of the engine.

Figure 15:
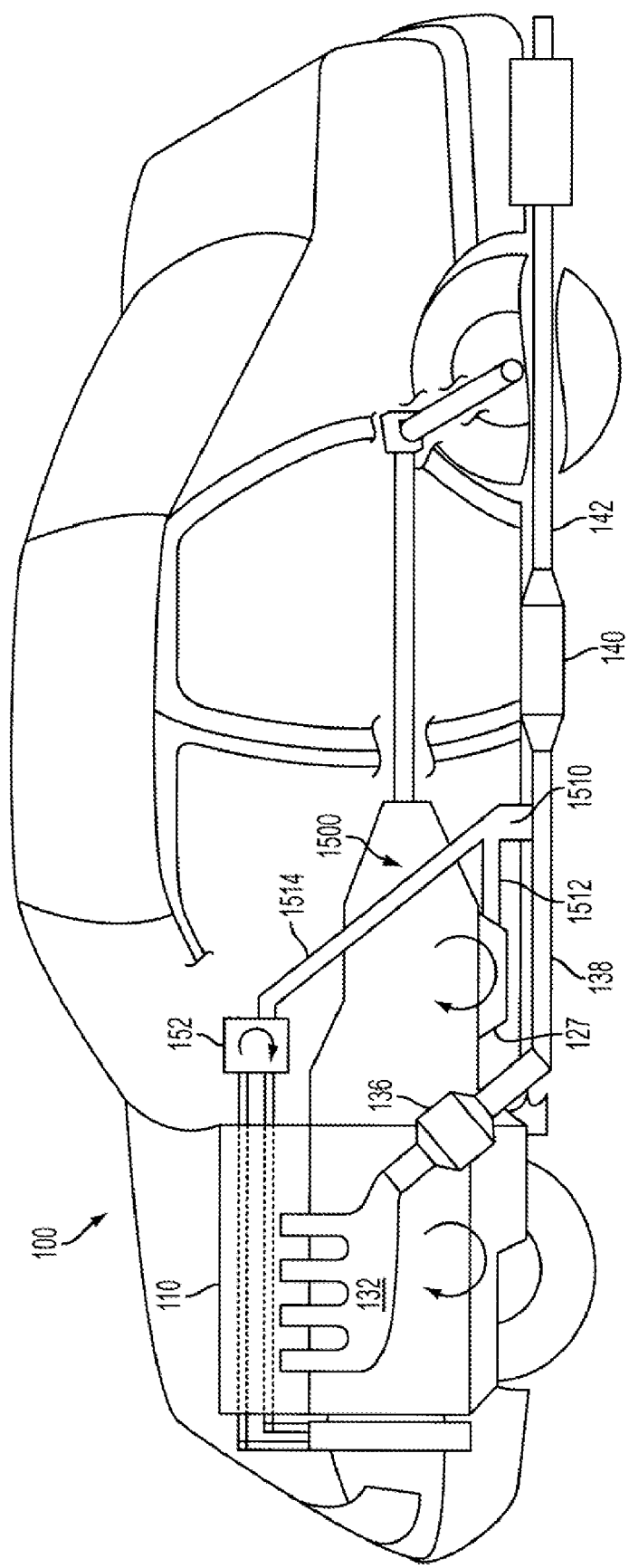

FIG. 15 illustrates an example where a heat pipe 1500 includes multiple branches, for example, as described above with reference to FIG. 4 or 5. In this particular example, a base end 1510 or heat pipe 1500 including the boiler of the heat pipe is thermally coupled to the exhaust passage, while an end of a first branch 1512 is thermally coupled to the transmission oil pan and a second branch 1514 is thermally coupled to the engine coolant system. In this way, heat may be transferred from the exhaust passage to two or more engine system fluids, at least during some conditions.

It will be appreciated that the various heat pipe configurations described herein with reference to FIGS. 2-5 may be used to transfer heat among various components of the engine and vehicle systems as described herein with reference to FIGS. 6-15. Further, it will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. An engine system for a vehicle, comprising:
    an engine producing exhaust gases;
    an exhaust passage for transporting the exhaust gases to a surrounding environment; and
    a plurality of heat pipes for transferring heat energy between a boiler end and a condenser end of each heat pipe without a mechanical pump, heat being transferred via evaporation of a working fluid of each heat pipe at the boiler end and condensation of the working fluid at the condenser end, the plurality of heat pipes comprising:
        a first heat pipe having a first end in thermal contact with the exhaust passage and a second end in thermal contact with a first fluid of the engine system, and
        a second heat pipe having a first end in thermal contact with the exhaust passage and a second end in thermal contact with a second fluid of the engine system, the first heat pipe being configured to provide increased heat transfer between the exhaust passage and the first fluid during at least a first temperature condition and the second heat pipe being configured to provide increased heat transfer between the second fluid and the exhaust passage during at least a second temperature condition different than the first temperature condition, wherein the first temperature condition is during a warm-up operation of the engine and the second temperature condition is during an operation where combustion is discontinued in at least one cylinder of the engine.

2. The engine system of claim 1, wherein the first heat pipe is configured to transfer heat from the exhaust passage to the first fluid during the first temperature condition.

3. The engine system of claim 1, wherein the first heat pipe is configured to transfer heat from the exhaust passage to the first fluid during the first temperature condition and the second heat pipe is configured to transfer heat from the exhaust passage to the second fluid during the second temperature condition.

4. The engine system of claim 1, wherein the first temperature condition is less than the second temperature condition.

5. The engine system of claim 1, wherein the first fluid is one of an engine oil, an engine coolant, and a transmission oil; and wherein the second fluid is a different one of the engine oil, the engine coolant, and the transmission oil.

6. The engine system of claim 1, wherein the first fluid is one of an engine oil, an engine coolant, and a transmission oil; and wherein the second fluid is the same as the first fluid.

7. The engine system of claim 1, further comprising at least one exhaust aftertreatment device arranged along the exhaust passage, wherein the first heat pipe is in thermal contact with the exhaust passage downstream of said at least one exhaust aftertreatment device.

8. The engine system of claim 7, wherein the second heat pipe is in thermal contact with the exhaust passage upstream of the location where the first heat pipe is in thermal contact with the exhaust passage.

9. The engine system of claim 1, wherein the first heat pipe includes a first working fluid and the second heat pipe includes a second working fluid having a different physical property than the first working fluid.

10. A method of transferring heat throughout a vehicle-engine system, comprising:
   during a first condition, increasing an amount of heat transferred between a first region being an engine-exhaust passage and a second region being an engine-lubrication system via a first heat pipe path; and
   during a second condition with partial-cylinder deactivation, increasing an amount of heat transferred between a third region and a fourth region of the engine system via a second, different, heat pipe path.

11. The method of claim 10, wherein the third region of the engine system is a portion of the exhaust passage upstream of the first region.

12. The method of claim 11, wherein the fourth region of the engine system is a transmission coupled to the engine.

13. The method of claim 11, wherein the fourth region includes at least one of a lubrication system and a cooling system; and wherein the lubrication system includes at least one of an engine oil and a transmission oil and the cooling system includes at least one of an engine coolant.

14. The method of claim 10, wherein the third region of the engine system is the engine-lubrication system and the fourth region is at least one of a lubrication system of a transmission coupled to the engine or a coolant system of the engine.

15. The method of claim 10, wherein the third region of the engine system is a coolant system of the engine and the fourth region is a lubrication system of at least one of the engine and a transmission coupled to the engine.

16. The method of claim 10, wherein the first heat pipe path and the second heat pipe path include different working fluids.

17. The method of claim 10, wherein the first heat pipe path and the second heat pipe path share a common working fluid.

18. A heat pipe for a vehicle system, comprising:
   a first working fluid and a second working fluid in the heat pipe, the second working fluid having different physical properties from the first working fluid so that the heat pipe has different heat transfer characteristics at different operating conditions according to physical properties of the first working fluid and the second working fluid;
   a base thermally coupled to a first region of the vehicle system, said base forming a boiler, the first region including an exhaust passage of an engine of the vehicle system;
   a first elongate branch having an end coupled to the base and an opposite end in thermal communication with a second region of the vehicle system, said opposite end forming a condenser; and
   a second elongate branch having an end coupled to the base and an opposite end in thermal communication with a third region of the vehicle system, said opposite end forming a condenser, the second and third regions each including a different one of an engine oil, a transmission oil, and an engine coolant.

\* \* \* \* \*